United States Patent [19]

Mould et al.

[11] 4,290,696

[45] Sep. 22, 1981

[54] SPECTROPHOTOMETRIC SYSTEM

[75] Inventors: Henry M. Mould, Penn; George E. Hirst, High Wycombe, both of England

[73] Assignee: Perkin-Elmer Limited, Beaconsfield, England

[21] Appl. No.: 77,977

[22] Filed: Sep. 24, 1979

Related U.S. Application Data

[62] Division of Ser. No. 819,837, Jul. 28, 1977, which is a division of Ser. No. 698,042, Jun. 21, 1976, abandoned.

[30] Foreign Application Priority Data

Oct. 24, 1975 [GB] United Kingdom ............. 43723/74

[51] Int. Cl.³ ............................................. G01J 3/02
[52] U.S. Cl. ............................... 356/300; 350/162 R; 356/319
[58] Field of Search .............................. 250/339, 347; 350/162 R, 266, 272–275, 288, 290, 292, 314, 320, 321; 356/51, 300, 319–325, 243

[56] References Cited

U.S. PATENT DOCUMENTS

| | | | |
|---|---|---|---|
| 2,062,764 | 12/1936 | Sands et al. | 350/268 |
| 2,956,170 | 10/1960 | Sibley | 350/162 R |
| 3,334,956 | 8/1967 | Staunton | 350/266 |
| 3,563,654 | 2/1971 | Vermande | 356/330 |
| 3,721,487 | 3/1973 | Pieuchard et al. | 350/162 R X |
| 3,885,162 | 5/1975 | Geertz | 356/243 X |

OTHER PUBLICATIONS

Jenkins et al., "Fundamentals of Optics," Third Edition, McGraw-Hill Book Company, Inc. New York, 1957, pp. 572–587.

Primary Examiner—F. L. Evans
Attorney, Agent, or Firm—S. A. Giarratana; F. L. Masselle; R. A. Hays

[57] ABSTRACT

A spectrophotometric system includes an optical device for providing an optical path from a radiation generating means to a radiation receiving means. The optical device includes a substantially opaque layer which defines first and second coplanar face regions having different optical functions.

11 Claims, 4 Drawing Figures

SPECTROPHOTOMETRIC SYSTEM

The present application is a division of pending U.S. patent application Ser. No. 819,837 filed July 28, 1977 which, in turn, is a division of U.S. patent application Ser. No. 698,042 filed June 21, 1976, now abandoned.

BACKGROUND OF THE INVENTION

The present invention relates to optical devices of the type wherein material layers, or different portions of one layer, having optically distinguishable functions are fixedly supported side by side in accurate geometrical relationship, and in particular to optical devices wherein a plane reflecting surface and a plane diffraction grating surface are held in substantially parallel relationship with respect to each other.

A typical example of a device of this type may be found in some infrared spectrophotometers in the form of a plane mirror and a plane scatter grating, bonded side by side to a generally flat support and rotatable therewith from one to the other of two operative positions. The mirror is normally inserted in the photometric optics, but when the wavelength being scanned is so long that stray radiation of shorter wavelengths begin to affect photometric accuracy, the scatter grating (of suitable grating constant) is substituted. The device may, for example, be located just ahead of the monochromator entry slit.

It is well known that a scatter grating will specularly reflect in the zero order substantially all radiation the wavelength of which is longer than some critical value, which depends on the grating constant, and disperse in the higher orders substantially all radiation having wavelengths shorter than said value. In other words, said grating may be arranged, in a known manner, to act as a plane mirror for certain bands of optical frequencies and as a dispersive element for the higher frequencies. When so arranged, the grating becomes a filter, essentially enabling the wanted frequencies to pass through while rejecting the remainder.

It has become standard practice to mount the plane mirror and this scatter grating separately on a support to form a rotatable assembly capable of being rotated to present to the photometric beam either the plane mirror or the scatter grating, the change over being performed automatically by the operation of machine elements within the spectrophotometer.

Clearly, it is important for the working surface of the mirror and the scatter grating, respectively, to be set in parallel relationship, with a reasonably high degree of accuracy, or the photometric beam will be shifted when switching over from one element to the other. Heretofore, the setting-up operation was difficult and time consuming mainly because of the wavelength of the radiation that must be used for the purpose is the one for which the scatter grating acts as a mirror. Such a wavelength is in a region of the spectrum, which is not only invisible, but also not conveniently detected.

SUMMARY OF THE INVENTION

In order to accomplish the desired results, this invention provides a new and improved optical device, which includes at least one layer of material having two optically different regions, and an intervening bonding layer for bonding the layer to a common substrate in predetermined geometrical relationship, one region with respect to the other. According to one aspect of the invention, the aforementioned layer of material is a specular material, and one of said optically different regions is a plane mirror face and the other of the regions is a scatter grating face. The intervening bonding layer bonds the faces in substantially parallel relationship one with respect to the other.

In another form of the invention, there is provided a method of manufacturing an optical device, which includes the steps of depositing a film of releasing agent on the working surface of a master having surface regions arranged to ensure a desired geometrical relationship, depositing on the film at least one layer of material having predetermined optical characteristics, bringing the layer into contact with a bonding agent laid upon a single substrate to form an intervening bonding layer, allowing the bonding layer to set, and finally releasing the master. According to another aspect of the invention, the method of manufacturing an optical device includes the steps of depositing a film of releasing agent on the working face of a master having a plane optically flat portion, which is in parallel relationship with a high degree of accuracy with respect to a ruled optically flat portion, depositing a layer of specular material on the working face, bringing said layer into contact with a bonding agent laid upon a single substrate so as to form an intervening bonding layer, allowing the bonding layer to set, and finally releasing the master.

In still another form of the invention, there is provided a new and improved method of making a master, which may be used in the foregoing method of manufacturing the optical device that, in one form thereof, includes the step of ruling a preselected portion only of an optically flat surface of a blank, and in another form thereof includes the steps of cutting out a portion of a blank having an optically flat surface, and bonding in the cut out space an element having a working surface of the grating master in substantially parallel relationship with respect to each other.

In a further aspect of the invention, there is provided a spectrophotometric system comprising a source of radiation, radiation receiving means spaced from the radiation source, an optical device interposed between the radiation source and the radiation receiving means for directing radiation from the source to the radiation receiving means, the optical device having adjacent optically active different regions formed in a continuous layer by the simultaneous replication of the optically active different regions and including a single rigid substrate, at least one continuous layer of material having two adjacent simultaneously replicated optically active different regions in predetermined geometrical relationship one to the other, and means for carrying the optical device for movement enabling alternate disposition of the optically active different regions respectively between the radiation source and the radiation receiving means whereby the optically active different regions alternately direct radiation from the radiation source to the radiation receiving means.

In a still further aspect of the present invention, there is provided a spectrophotometric system comprising photometric optics including means for generating photometric radiation, radiation receiving means in spaced relation with the radiation generating means, an optical device interposed between the radiation generating means and the radiation receiving means, the optical device having a layered material defining optically active and distinguishable face regions arranged in predetermined geometrical relationship, rigid substrate means for supporting the layered material transferred thereto by replication from a master arranged to secure the predetermined geometrical relationship at transfer, and a film of bonding agent between the transferred layered material and the rigid substrate means permanently to maintain the predetermined geometrical relationship after transfer and means for mounting the optical device for movement between different operative positions selectively to interpose the optically active face regions between the radiation generating means and the radiation receiving means.

DETAILED DESCRIPTION OF THE PREFERRED EMBODIMENT

Figure 1:
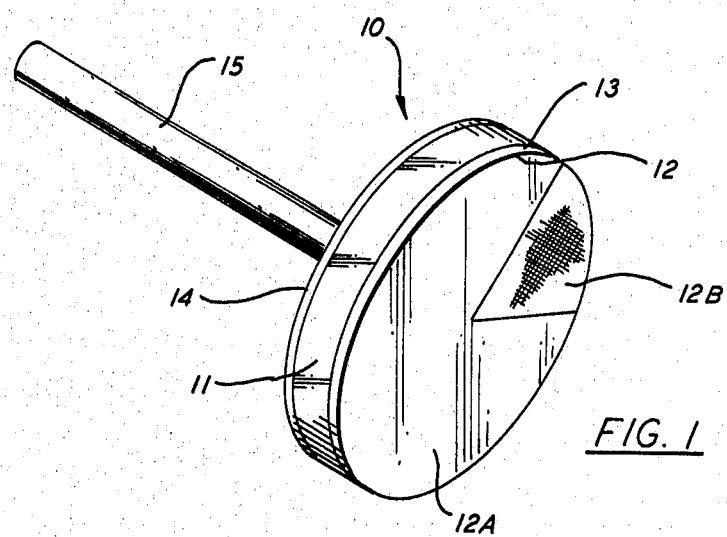
FIG. 1 is a perspective view of a combined mirror and scatter grating device constructed in accordance with the concepts of the present invention.
Figure 4:
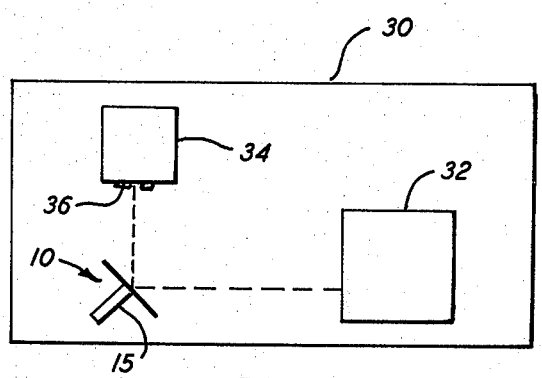
FIG. 4 is a schematic representation of an infrared spectrophotometer containing the combined mirror and scatter grating device illustrated in FIG. 1.

In the embodiment of the invention illustrated in FIG. 1, there is shown a combined mirror and scatter grating device generally designated 10, intended for use in an infrared spectrophotometer, illustrated schematically in FIG. 4, which comprises a substrate in the form of a glass disc 11 having a ground surface for supporting a thin layer of aluminum 12 through an intervening bonding layer 13. The layer 12 includes a mirror portion 12A which is disposed in co-planar relationship with respect to a scatter grating portion 12B.

Still referring to FIG. 1, the disc 11 is bonded to a metal backing 14 that is fixedly connected to a shaft 15 which, in turn, is mounted for rotation in bearings (not shown) so that either the mirror portion 12A or the scatter grating portion 12B may be presented to the photometric beam of the spectrophotometer at a suitable location within the photometric system.

Figure 2:
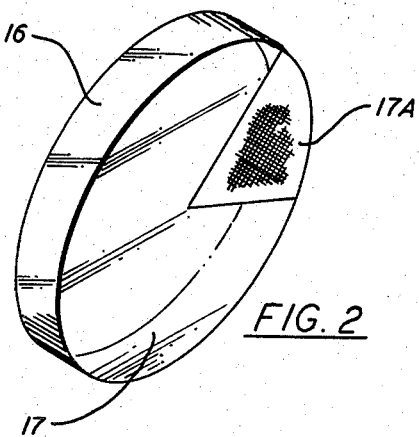
FIG. 2 is a perspective view of a master, used for making the combined mirror and scatter grating device of FIG. 1.

FIG. 2 illustrates one embodiment of a master, which is used for producing the layer 12 of FIG. 1, on prepared blanks. The master comprises a glass disc 16 having an optically flat working surface 17, with a portion thereof ruled out on a ruling engine so that the working surface 17 acts as a combined master for the mirror and the scatter grating.

Figure 3:
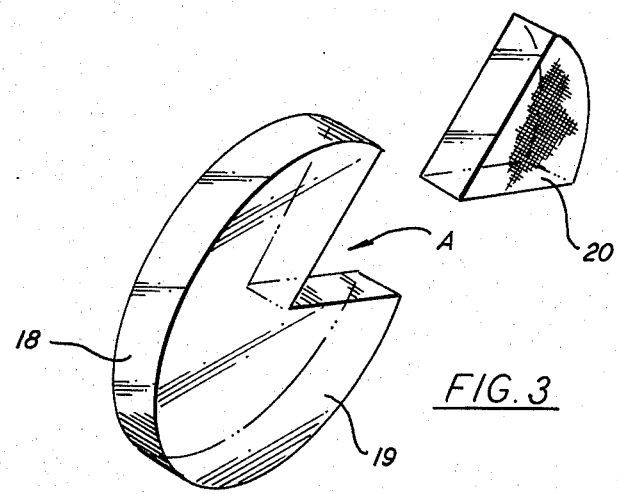
FIG. 3 is an exploded perspective view of a second embodiment of a master, used for making the combined mirror and scatter grating device of FIG. 1.

Referring next to FIG. 3, there is illustrated another embodiment of a master, which is used to produce the layer 12 of FIG. 1, on prepared blanks. This master comprises a glass disc 18 having an optically flat working surface 19, which has a portion thereof cut out, as indicated by the arrow A. A separately ruled grating master 20 is fitted in the cut-out portion A. A composite master is then formed by bonding the grating master 20 in the cut-out portion of the disc 18, while ensuring accurate parallelism between the working surface 19 and the working surface of the grating master 20.

According to the invention, either the master of FIG. 2 or the master of FIG. 3 can be used for producing the device shown in FIG. 1 by virtue of a new and improved method, which automatically ensures a high degree of optical flatness and parallelism of the portions 12A and 12B of layer 12, even when the ground face of the glass substrate 11 is not accurately flat.

In this method of producing the layer 12, the working face of the master is first covered with a molecular film of a suitable release agent such as an agent having a base of silicone oil. A thin layer of aluminum is then deposited on the release film by known vacuum evaporation techniques. Next, a large blob of epoxy resin is placed at the center of a ground face of a glass blank, corresponding to disc 11 in FIG. 1, and the aluminized face of the master is gently brought into contact with the blob so as to spread it evenly all around until a uniform layer of uncured epoxy is formed. Temporary spacers or other means may be employed, if necessary, to ensure that the thickness of this layer is uniform and adequate to prevent the aluminum surface from contacting any asperities of the ground face of the glass blank. After the epoxy has been allowed to cure, the master is released by gentle tapping and any surplus epoxy is trimmed off from the periphery of the blank.

It will be appreciated that the above method of manufacture not only obviates the need for the setting-up operation referred to hereinbefore but, in addition, allows a substrate to be used which is ground to only approximate flatness, the ground state actually being desirable as it provides a good key for the bonding layer. This contrasts with heretofore known methods, wherein the mirror and the scatter grating were produced on separate optically flat blanks and were then separately bonded to a support after laborious setting up. The method of the present invention provides considerable simplification and cost saving and at the same time ensures a product in which a high degree of repeatable accuracy is achieved by a technique that automatically imparts to the product the accuracy built into the master.

Further, in accordance with the present invention, if the portion of the working face, reserved for the formation of the grating layer in either of the masters referred to above, is suitably roughened in a known manner, the master may be used for reproducing mirror and scatter plate devices. It is, of course, well known that a scatter plate is capable of acting as a reflection filter, capable of rejecting much of the stray radiation having wavelengths shorter than the wavelengths for which the scatter plate has been designed. The major difference between a scatter grating and a scatter plate in terms of performance is that in the latter case the cut off is much less sharp than in the former case.

It will be appreciated that the present description refers to the deposition of only one material, i.e. aluminum, in describing the device of FIG. 1 and the manufacture thereof. However, there are applications where two or more optical functions require the use of different materials. This can be easily arranged by resorting to well known masking techniques, which confine the deposition of a given material to the surface area for which it is intended.

FIG. 4 illustrates an infrared spectrophotometer, generally indicated 30, which comprises photometric optics 32 including a source of radiation, and a monochromator 34 having an entry slit 36 for receiving radiation from the radiation source. The combined plane mirror and plane scatter grating device 10 described previously and replicated from a common master in accordance with the teachings of the present invention, is rotatably mounted between the photometric optics 32 and the monochromator 34. Up to a predetermined upper limit of the scanned wavelength, the device 10 is maintained in such an attitude that its plane mirror portion 12A meets the incoming photometric beam and directs it into the entry slit 36. Beyond that upper limit, the device 10 is rotated (by means not shown) so that its plane scatter grating portion 12B is interposed to meet the incoming photometric beam. In this latter attitude, the device 10 tends to reflect into the slit 36 only rays the wavelength of which is greater than the upper limit.

Thus, an optical device 10 constructed in accordance with the present invention is readily disposed in a typical infrared spectrophotometer and in lieu of the separate mirror and scatter grating typically utilized in such spectrophotometer as discussed previously in the Background of the Invention.

Although specific embodiments have been illustrated and described, it will be obvious to those skilled in the art that various modifications may be made without departing from the spirit of the invention, which is intended to be limited solely by the appended claims.

What is claimed is:

1. A spectrophotometric system comprising:
photometric optics including means for generating photometric radiation;
radiation receiving means is spaced relation with said radiation generating means;
an optical device, interposed between said radiation generating means and said radiation receiving means, for providing an optical path from said radiation generating means to said radiation receiving means, said optical device comprising;
a substantially opaque layer, said layer defining at least first and second coplanar face regions, said face regions having distinguishable optical functions being arranged in a predetermined geometrical relationship;
means for supporting said layer, said means being a rigid substrate;
a film bonding agent, between said layer and said rigid substrate means, for permanently maintaining said predetermined geometrical relationship, and means for mounting said optical device for movement between different operative positions to selectively interpose said face regions between said radiation generating means and said radiation receiving means.

2. A spectrophotometric system as claimed in claim 1, wherein said rigid substrate is a unitary body and said layer is continuous.

3. A spectrophotometric system as claimed in claim 2, wherein said substrate is glass having a ground surface adjacent said film bonding agent.

4. A spectrophotometric system as claimed in claim 3, wherein said rigid substrate is disc-like and is mounted for rotation around an axis traverse to said disc through the disc center.

5. A spectrophotometric system as claimed in claim 1, wherein said film bonding agent is a polymerized substance.

6. A spectrophotometric system as claimed in claim 5, wherein said film bonding agent is an epoxy resin.

7. A spectrophotometric system as claimed in claim 6, wherein said film bonding agent has approximately uniform thickness.

8. A spectrophotometric system as claimed in claim 1, wherein said layer is a vacuum evaporated layer.

9. A spectrophotometric system as claimed in claim 8, wherein said vacuum evaporated layer is aluminum.

10. A spectrophotometric system as claimed in claim 1, wherein said first face region is a plane mirror and said second face region is a scatter grating said combined device being mounted for rotation around an axis selectively to enable either face region to be interposed between said radiation generating means and said radiation receiving means.

11. A spectrophotometric system as claimed in claim 10, wherein said system includes a monochromator said combined device is positioned just before said monochromator and is arranged to direct said photometric beam issuing from said photometric optics into said monochromator.

* * * * *